No. 797,404. PATENTED AUG. 15, 1905.
O. V. COLE.
DEVICE FOR FEEDING ANIMALS.
APPLICATION FILED SEPT. 29, 1904.
2 SHEETS—SHEET 2.
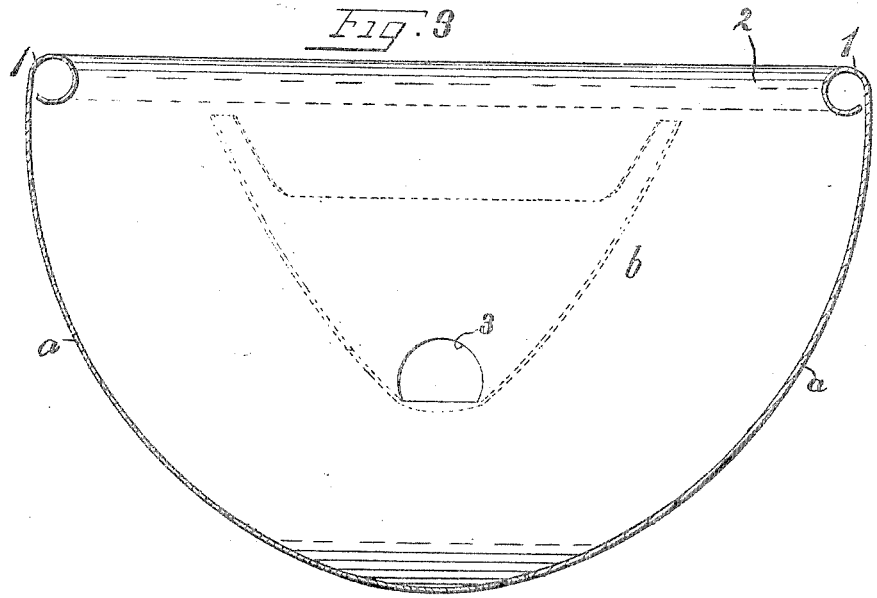
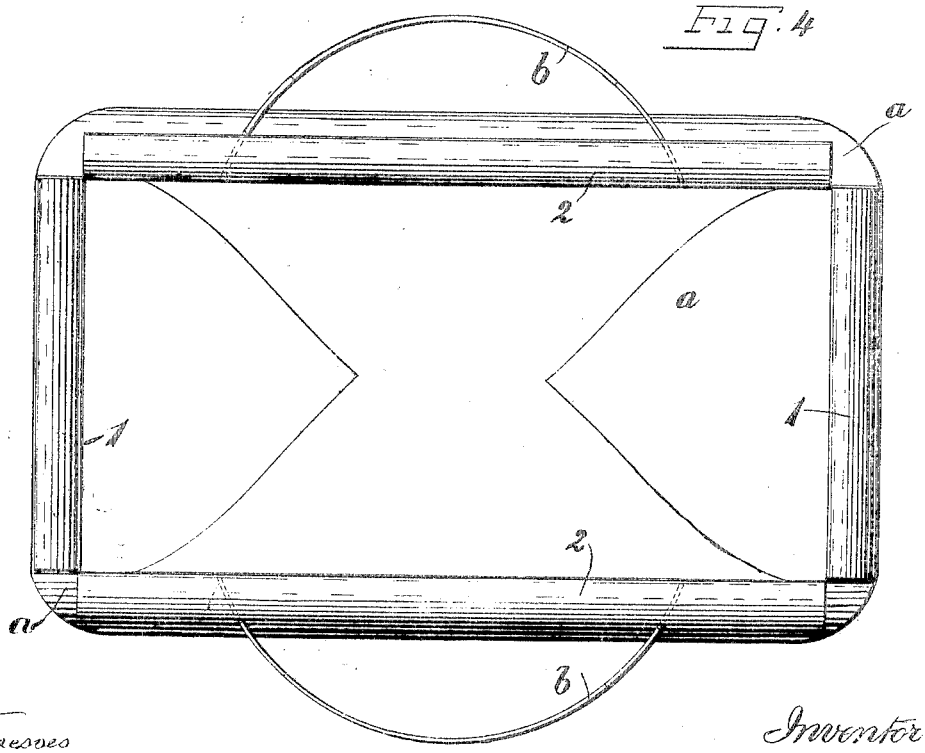
Witnesses
Inventor
Oakley V. Cole.
per Harold Serrell
atty
ANDREW B. GRAHAM CO., PHOTO-LITHOGRAPHERS, WASHINGTON, D. C.

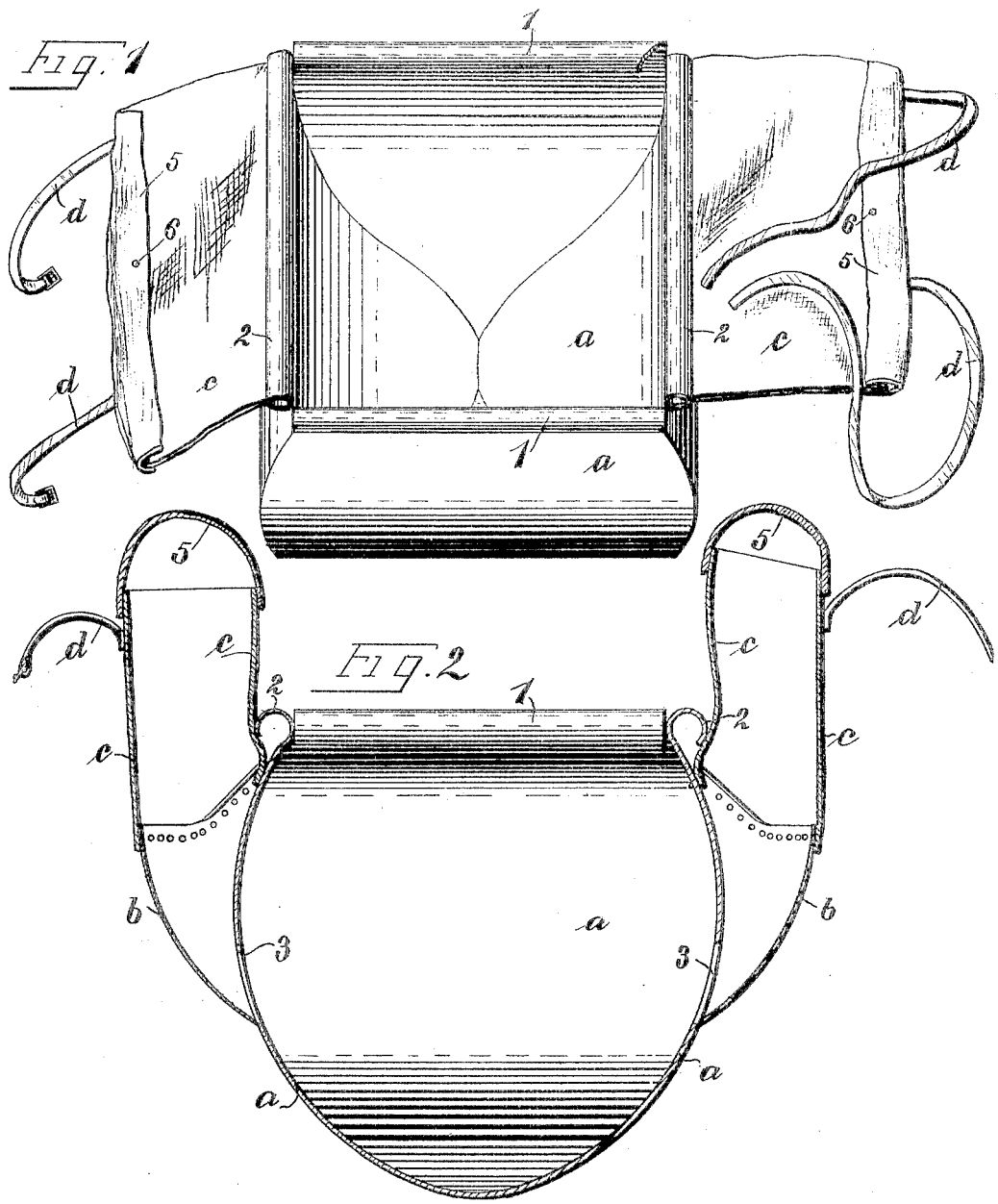

UNITED STATES PATENT OFFICE.

OAKLEY V. COLE, OF NEW YORK, N. Y., ASSIGNOR TO ALICE H. COLE, OF ALBANY, NEW YORK.

DEVICE FOR FEEDING ANIMALS.

No. 797,404. Specification of Letters Patent. Patented Aug. 15, 1905.

Application filed September 29, 1904. Serial No. 226,433.

*To all whom it may concern:*

Be it known that I, OAKLEY V. COLE, a citizen of the United States, residing in the borough of Manhattan, in the city, county, and State of New York, have invented an Improvement in Devices for Feeding Animals, of which the following is a specification.

In the feed-bags generally in use the feed is placed in the bottom of the bag and the animal in eating buries its nose in the feed, much to its discomfort, and when a certain amount of the feed has been consumed the remainder is out of the animal's reach, and consequently a large part of the feed is spilled and wasted by the animal throwing up its head in an endeavor to reach it. I am aware that several devices have been constructed in an effort to overcome these difficulties, such as providing a grain-chamber surrounding a central feeding-chamber, with a communication between the two chambers, so that the grain is supplied to the feed-chamber; but in such instance the animal's head is still confined in a bucket and there is no provision for preventing the animal's nostrils becoming choked. In another instance a foraminous space has been provided in the side wall of the bottom of a feed-bag; but in practice it has been found that this space becomes obstructed by the feed, and thus fails to accomplish the desired effect. I am also aware that a feed-bag has been constructed with a rigid round bottom and flexible sides with flexible feed-receptacles at each side of the bag communicating with the interior of the bag and having a relatively large orifice in the front part of the bag and a slit in the rear part for the purpose of ventilation; but the bottom is not of a character to prevent the spilling of the feed if the animal throws up its head, and the flexible feed-receptacles have a tendency to sag and bind, thus obstructing the flow of the feed to the bottom.

The object of my invention is, first, to avoid the use of a bag surrounding the horse's head; second, to provide a feed-trough of such shape that the animal may feed in an easy and natural manner with free breathing; third, to prevent the spilling of the feed should the animal for any cause throw up its head while feeding; fourth, to provide a perfectly smooth rim to the trough, so as to prevent injury to the animal while feeding and at the same time increase the strength of the trough; fifth, to allow for an easy and continuous flow of the feed to the bottom of the trough by providing means to prevent any sagging or binding in the flexible grain-bags.

In carrying out my invention I provide a trough of metal or other rigid material with a rectangular top and side and end walls curved to a common center forming a bottom. The top edges of the trough are overturned into rolls, the ends being overturned inwardly and the sides outwardly. In each side of the trough is cut an opening, and on each side of the trough outside these openings I provide a rigid pocket attached to or made integral with the trough and connect with each of these pockets a flexible holder for grain or feed.

In the accompanying drawings, Figure 1 is a perspective view of my improved feeding device. Fig. 2 is a vertical central section. Fig. 3 is a longitudinal section of the trough with the flexible holders removed, and Fig. 4 is a plan view of the same.

The trough $a$ is of metal or other rigid material, preferably with a rectangular top and side and end walls curved to a common center, which center when the trough is in place for feeding comes directly beneath the animal's mouth.

The top edges 1 of the ends of the trough are overturned inwardly into rolls, and the top edges 2 of the sides of the trough are overturned outwardly.

In each side of the trough $a$ and at about the center thereof is cut an arched opening 3 about an inch and a quarter wide by an inch and a half high, and integral with the trough $a$ or rigidly attached thereto outside these openings 3 are rigid pockets $b$, preferably of approximately V shape with the center of the smaller end joining the side wall of the trough $a$ at the bottom or lower edge of the openings 3, whereby the side walls of the trough become the inner walls of the pockets $b$.

I provide a holder $c$ of flexible material at each side of the trough $a$ for holding the feed. These flexible holders $c$ are open at the bottom and communicate with the pockets $b$. The inner lower edge of each holder $c$ is attached to the trough $a$ at or below the outwardly-overturned sides 2, and the outer lower edge is attached to the top of the pocket $b$. The width of the pockets $b$ at the top is preferably the same as that of the holders $c$, so that when the holders are secured to the top of the pockets the pockets form an approximately V-shaped rigid bottom to the same. These holders may be attached by rivets, as shown, or in any other suitable or desired manner.

The rigid pockets $b$ act as spreaders and hold the lower ends of the flexible holders in an expanded position, thus preventing any obstruction in the flow of the grain by sagging or binding, which assures an easy and continuous flow of the feed from the holders $c$ to the bottom of the trough $a$.

The top edges 1 and 2 of the trough $a$ being overturned into rolls present a smooth surface for contact with the animal's head, thus preventing chafing or scratching, and the end edges being overturned inwardly form a roll which serves to throw back any feed should it be thrown up by the animal raising its head while feeding, thus preventing waste of the feed. These overturned edges also increase the rigidity and strength of the trough.

I prefer to provide a flap 5 for the top of each holder $c$, which may be fastened by a button 6 after the holders have been filled. These flaps may be formed integral with the holders by making one side of the holder sufficiently longer than the other.

Straps $d$ serve to suspend the flexible holders $c$ and the trough with the supply of grain from the animal's head, and as the straps are provided with buckles they may be taken up or let out in adjusting the feeding device in place.

The feed occupies but a small part of the trough $a$, and the construction of the trough gives the animal free supply of air while feeding.

I claim as my invention—

1. A device for feeding animals consisting of a trough of rigid material with a rigid pocket on each side thereof, there being an opening between each pocket and the trough, and a flexible holder connected to the pocket on each side of the trough and communicating with the pocket.

2. A device for feeding animals consisting of a trough of rigid material of rectangular shape at the top with its side and end walls curved to a common center forming a bottom, a rigid pocket on each side of the trough, there being an opening between each pocket and the trough, and a flexible holder connected to the pocket on each side of the trough and communicating with the pocket.

3. A device for feeding animals consisting of a trough of rigid material having its front and back edges overturned inwardly into rolls, a rigid pocket on each side of the trough, an opening in each side of the trough communicating with the pocket, and a flexible holder connected to the pocket on each side of the trough and communicating with the pocket.

4. A device for feeding animals consisting of a trough of rigid material of approximately rectangular shape at the top, and side and end walls curved to a common center forming a bottom, the front and back top edges of the trough being overturned inwardly into rolls, and the top side edges overturned outwardly into rolls, a rigid pocket on each side of the trough, there being an opening in each side of the trough communicating with the pocket, and a flexible holder connected to the pocket on each side of the trough and communicating with the pocket.

Signed by me this 26th day of September, 1904.

OAKLEY V. COLE.

Witnesses:
 GEO. T. PINCKNEY,
 BERTHA M. ALLEN.